United States Patent [19]

Soultanian

[11] Patent Number: 4,560,915
[45] Date of Patent: Dec. 24, 1985

[54] ELECTRONIC CHARGING CIRCUIT FOR BATTERY OPERATED APPLIANCES

[75] Inventor: Setrak D. Soultanian, Chicago, Ill.

[73] Assignee: Wen Products, Inc., Chicago, Ill.

[21] Appl. No.: 643,400

[22] Filed: Aug. 23, 1984

[51] Int. Cl.$^4$ ............................................... H02J 7/00
[52] U.S. Cl. ....................................... 320/35; 320/20; 320/23; 320/37
[58] Field of Search .................... 320/2, 20, 22, 23, 35, 320/36, 37, 38; 361/58, 106

[56] References Cited

U.S. PATENT DOCUMENTS 4,297,630 10/1981 Mullersman ........................... 320/23

Primary Examiner—Peter S. Wong
Assistant Examiner—Anita M. Ault
Attorney, Agent, or Firm—Hill, Van Santen, Steadman & Simpson

[57] ABSTRACT

An electronic charging circuit for battery operated appliances has a thermostat in physical, heat transferring contact with a battery pack to be charged, a power resistor in physical, heat transferring contact with the thermostat, the power resistor being connected in series with the battery charger and an electronically timed switch. Because certain types of fast charge batteries must be cooled after relatively rapid discharge, such batteries requiring approximately 10 times longer to reach full charge when overheated than when cooled, the electronically timed switch prevents commencement of charging of the battery pack after a rapid discharge until after the elapse of a selected amount of time sufficient to permit the battery pack to cool.

13 Claims, 3 Drawing Figures

ELECTRONIC CHARGING CIRCUIT FOR BATTERY OPERATED APPLIANCES

BACKGROUND OF THE INVENTION

1. Field of the Invention

The present invention relates to charging circuits for batteries, and in particular to a charging circuit for fast charge batteries having a timer means therein.

2. Description of the Prior Art

The use of rechargable fast charge batteries for operating hand-held appliances, such as drills and other power tools, is well known. Nickel-cadmium batteries possess relatively rapid recharging characteristics, and are therefor well suited for such use. A problem with such nickel-cadmium batteries, however, is that such batteries can safely be charged at a normal charging rate only while the temperature of the battery is below a certain temperature. When that temperature is reached, the batteries should be charged at a lesser rate, typically approximately 1/10th of the normal charging rate, in order to "top off" the charge of the batteries allowing them to cool and reach the maximum charge. The lesser charging rate is known as the "trickle mode" charge and in this mode the batteries may remain connected to a power source for months without suffering any degredation in performance. Failure to switch to the trickle mode charge by maintaining the normal charge rate will, however, result in venting of the batteries, which may result in destruction of the batteries or may drastically shorten the useful life of the batteries.

In recognition of the necessity to thermally monitor the recharging nickel-cadmium battery packs, conventional battery operated tools have circuitry generally as shown in FIG. 1. The circuit includes a charger 1 which is supplied with 120 VAC, and furnishes an out-put of 7.5 VDC. One out-out terminal of the charger is connected to a battery pack 2 to be charged. The battery pack is in physical contact with a thermostat 3, permitting heat transfer from the battery pack to the thermostat. A power resistor 4 is in physical contact with the housing or shell of the thermostat, also permitting heat transfer there between. The resistor 4 is connected to the remaining terminal of the charger 1. When the battery pack 2 is at room temperature, the thermostat is normally closed. When the charger 1 is connected to a 120 VAC source, the charging current flows through the normally closed contact of the thermostat 3 and charges the battery pack 2. When the batteries reach a charge close to the full charge, the temperature of the battery pack 2 increases causing the thermostat 3 to open. In conventional circuits, the thermostat 3 is set to open at approximately 113° F. (45° C.). When the thermostat 3 opens at this temperature, current now flows through the power resistor 4. The resistor 4 is typically a 20 ohm resistor with 0.25 watt power dissipating capacity. When such a resistor is utilized, the current therethrough drops to approximately 0.135 amp. The power dissipated by the resistor 4 is thus $(0.135)^2 \times 20 = 0.36$ watt. Because 0.36 watt is larger than 0.25 watt, the temperature of the resistor 4 is elevated, and maintains the temperature of the thermostat above the threshhold temperature (that is, typically above 113° F.). The thermostat 3 thus remains open even as the battery pack 2 cools, so that trickle mode charging is maintained indefinitely.

A problem associated with conventional charging circuitry of the type described above is that batteries such as nickel-cadmium batteries become elevated in temperature when discharged very rapidly, causing the thermostat 3 to open. Thus, when the batteries are shortly thereafter reconnected to a power source for recharging, the trickle mode charging will automatically be in effect and the batteries will reach full charge in approximately 10 hours, instead of the normal charging time of 1 hour. For this reason, manufacturers of hand tools utilizing batteries of this type, generally recommend that the tool be permitted to cool for approximately ½ hour before connecting it to a power source for recharging. Frequently, the user will in the meantime become occupied elsewhere, and forget to connect the tool to a recharging source after the passage of the designated time. Moreover, the user may have to estimate the passage of time, and cannot be positive that at the time of connection of the tool to the power source, the battery pack has cooled sufficiently to insure that trickle mode charging is not taking place.

SUMMARY

It is an object of the present invention to provide an electronic charging circuit for battery operated appliances which automatically commences charging of a battery pack only after the passage of a sufficient period of time to permit the battery pack after discharge to cool to a temperature at which full charging can safely be undertaken.

It is a further object of the present invention to provide such an electronic charging circuit which provides an indication to the user when the battery pack is fully charged.

The above objects are inventively achieved in an electronic charging circuit having an electronically timed switch connected in series with the power resistor and in parallel with the thermostat. The electronically timed switch is normally open. When the thermostat is open and the tool is connected to a power source for recharging, the switch will delay for a selected period of time before closing. During this delay, the battery pack will cool and the thermostat will close, permitting a high charging rate to commence. Charging continues until the battery pack increases in temperature, eventually causing the thermostat to open. By this time the electronically timed switch will have closed, and trickle current is supplied to the battery pack to continue charging through the electronically timed switch.

A light emitting diode or other visual indicator is connected in parallel with the power resistor to provide a visual indication when substantially full charging is reached.

DESCRIPTION OF PREFERRED EMBODIMENTS

Figure 1:
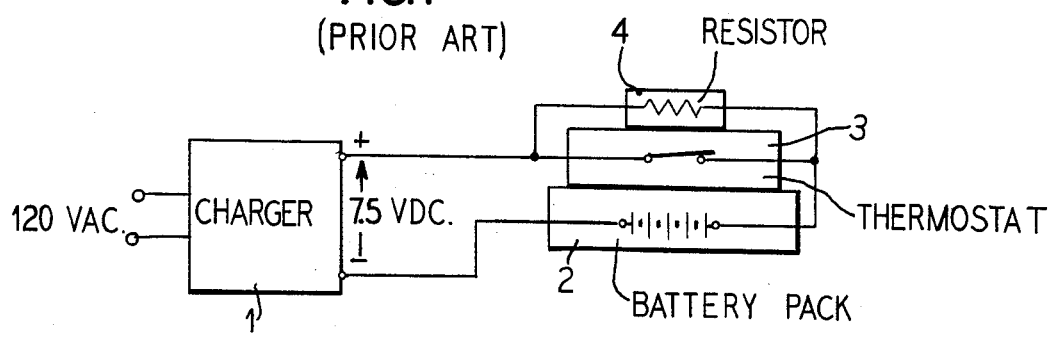
FIG. 1 is a block circuit diagram of a conventional charging circuit for a battery pack.
Figure 2:
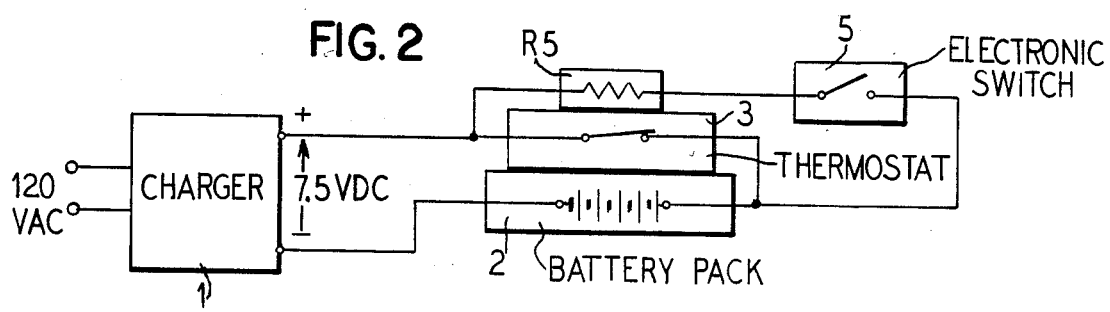
FIG. 2 is a block circuit diagram of a charging circuit for a battery pack constructed in accordance with the principles of the present invention.

A charging circuit or thermal monitoring of a battery pack constructed in accordance with the principles of the present invention is schematically shown in FIG. 2. Elements which correspond to elements discussed above in connection with the conventional circuit shown in FIG. 1 have been provided with identical references numerals. The charging circuit has a charger 1 which is connectable to a 120 VAC source, and which provides an output of 7.5 VDC. The battery pack 2 is connected to one output of the charger 1. A thermostat 3 is physically adjacent the battery pack 2 so as to permit heat transfer from the battery pack 2 to the thermostat 3. A resistor R5, which may have specifications corresponding to those identified above in connection with the resistor 4, is in contact with the thermostat 3 permitting heat transfer there between. An electronically timed switch 5 is connected in series with the resistor R5 and in parallel with the thermostat 3.

Operation of the circuit shown in FIG. 2 is as follows. After the battery pack 2 has been relatively rapidly discharged, presumably the temperature of the battery pack 2 will be sufficiently high so as to have it cause the contact of the thermostat 3 to open. If charging were attempted at this time in a conventional circuit, trickle mode charging would automatically be effected and the heat dissipated by the resistor would cause the thermostat 3 to permanently remain open and charging would require approximately 10 times longer than normal charging. In the circuit shown in FIG. 2, however, the electronically timed switch 5 which is normally open, closes only after the passage of a selected period of time sufficient to permit the battery pack 2 to cool, thereby in turn permitting the thermostat 3 to close, commencing a high charging rate.

An optimum delay of 30 minutes may be selected to accommodate the worst case of the battery pack 2 cooling at a room temperature of 85° F. and a continuous discharge rate of 8 amps of the battery pack 2. At this point the temperature of the battery pack 2 is approximately 150° F. and the temperature will fall to approximately 100° F. in approximately 25 minutes.

Figure 3:
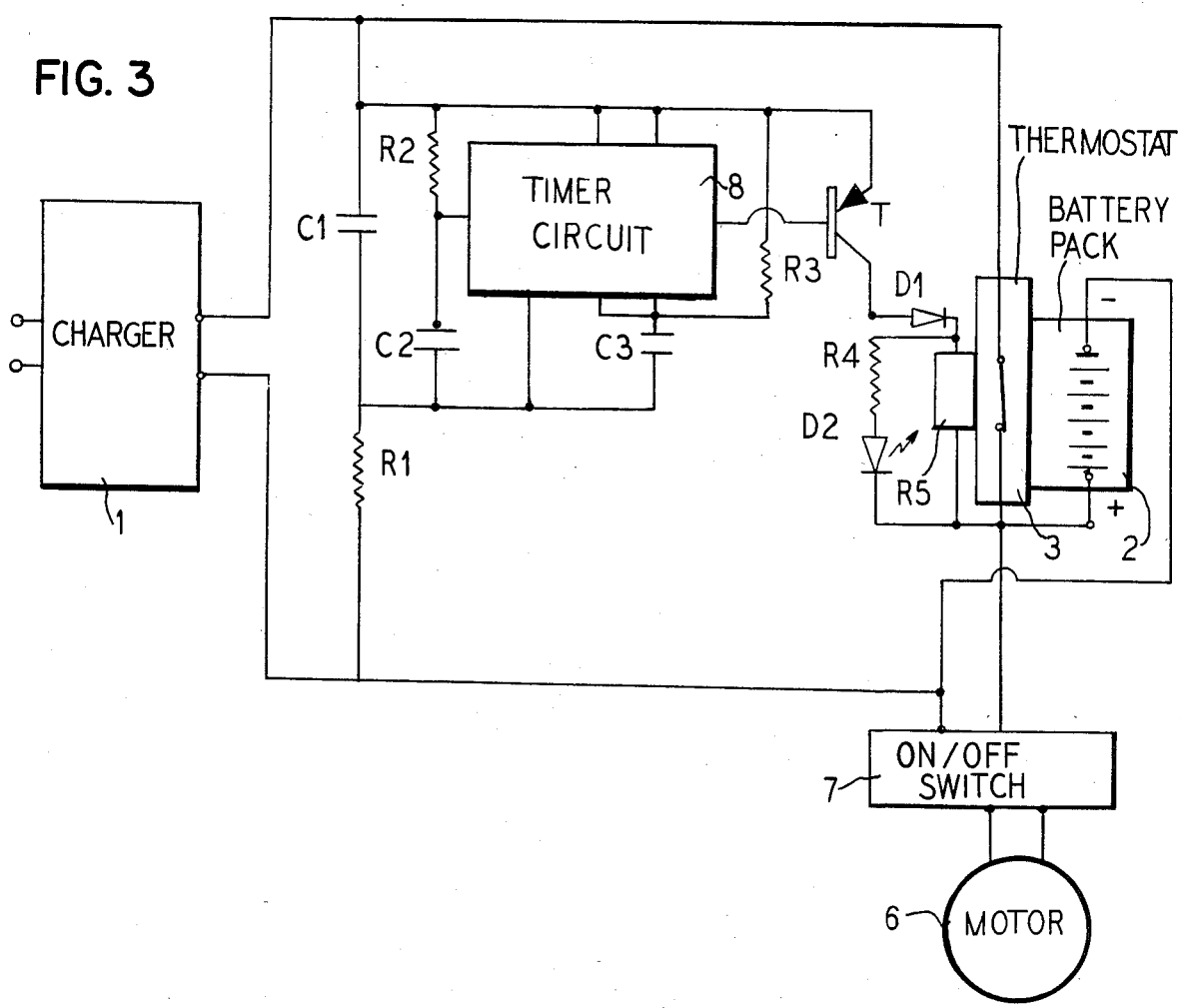
FIG. 3 is a more detailed circuit diagram of the charging circuit constructed in accordance with the principles of the present invention shown in FIG. 2.

Specific circuit elements for the circuits schematically shown in FIG. 2 are shown in FIG. 3. The circuit shown in FIG. 3 may be realized by a completely integrated chip, or may be constructed utilizing discrete components. In the embodiment shown in FIG. 3, the electronic switch 5 is comprised of a timer circuit 8, a transistor T, and associated resistors and capacitors connected thereto. The timer circuit 8 may be, for example, a commerically available integrated circuit such as an NE55CP dual in-line package. In the circuit shown in FIG. 3, a resistor R1 and a capacitor C1 set the bias voltage. A further resistor R2 and another capacitor C2 form a trigger circuit. When power is first applied the voltage at the pin of the timer circuit 8 connected between the resistor R2 and the capacitor C2, with respect to the pin connected to the other side of the capacitor C2, is 0. This voltage increases with a time constant determined by the product of R2 and C2 until reaching the voltage of the pin connected to the opposite side of the resistor R2.

A resistor R3 and a capacitor C3 form a timing network. When power is first applied, the voltage at the pin of the timer circuit 8 connected to the base of the transistor T is high, and the transistor T is accordingly non-conducting. After the time period determined by the resistor R3 and the capacitor C3, the voltage at this pin is low, and the transistor T is conducting. Whenever the thermostat 3 thereafter opens, trickle current flows through the transistor T, a diode D1, and the resistor R5. The resistor R5 dissipates heat and causes the thermostat 3 to remain in the open state. The diode D1 prevents biasing of the timer circuit 8 from the battery pack 2 when the thermostat 3 is open and the power source is removed.

A current limiting resistor R4 and a light emitting diode D2 are connected and parallel with the resistor R5. When the circuit is operating in a trickle mode, the diode D2 will provide a visual indication that the battery pack 2 is substantially charged.

Also shown in FIG. 3 are a motor 6, which is driven by the battery pack 2 and an on/off switch 7 interconnected therebetween.

Although modifications and changes may be suggested by those skilled in the art, it is the intention of the inventor to embody within the patent warranted herein all changes and modifications as reasonably and properly come within the scope of his contribution to the art.

I claim as my invention:

1. A charging circuit for a rechargable battery pack for use with a charger having one output terminal connected to said battery pack comprising:

a normally closed thermostat in thermal contact with said battery pack and connected to another output terminal of said charger;

a power resistor in thermal contact with said thermostat and also connected to said another output terminal of said charger; and a normally open electronically timed switch means connected in series with said power resistor and in parallel with said thermostat, said thermostat opening after discharge of said battery pack due to heating thereof associated with said discharge, and said electronically timed switch means automatically closing a selected period of time thereafter or permitting charging of said battery pack at a full charging rate only after said battery pack has cooled to a temperature sufficient to permit said thermostat to again close, said thermostat again opening after said battery pack is substantially fully charged due to heating thereof associated with said charging.

2. A charging circuit as claimed in claim 1 wherein said power resistor has a resistance and heat dissipating characteristics selected for generating sufficient heat for maintaining said thermostat open after said battery pack is substantially fully charged.

3. A charging circuit as claimed in claim 1 wherein said electronically timed switch means comprises:

a timer circuit connected to said charger; and a normally non-conducting transistor having a control electrode connected to an output on said timer circuit and an output electrode connected to said power resistor, said timer circuit supplying a signal to said control electrode after said selected period of time for switching said transistor to a conducting state.

4. A charging circuit as claimed in claim 3 further comprising a forward-bias diode interconnected between said output electrode of said transistor and said power resistor.

5. A charging circuit as claimed in claim 3 wherein said timer circuit is connected to a resistor and a capacitor for defining a time constant for said timer circuit equal to said selected period of time.

6. A charging circuit as claimed in claim 5 wherein said resistor and said capacitor are dimensioned such that said time constant is 30 minutes.

7. A charging circuit as claimed in claim 1 further comprising a visual indicator means connected in parallel across said power resistor for providing a visual indication when said battery pack is substantially fully charged.

8. A charging circuit as claimed in claim 7 wherein said visual indicator means is a light emitting diode.

9. A charging circuit for a rechargable battery pack for use with a charger having an output terminal connected to said battery pack comprising:
   a normally closed thermostat in thermal contact with said battery pack and connected to another output terminal of said charger, said thermostat opening after discharge of said battery pack due to heating thereof associated with said discharge;
   a power resistor in thermal contact with said thermostat and also connected to said another output terminal of said charger;
   a normally non-conducting transistor having an output electrode connected to said power resistor and having a control electrode; and
   a timer circuit having an output connected to said control electrode, said timer circuit and said transistor being connected in parallel across said thermostat,
said timer circuit automatically supplying a signal to said control electrode of said transistor after a selected period of time following opening of said thermostat for switching said transistor to a conducting state for permitting charging of said battery pack at a full charging rate only after said battery pack has cooled to a temperature sufficient to permit said thermostat to again close, said thermostat again opening after said battery pack is substantially fully charged due to heating thereof associated with said charging.

10. A charging circuit as claimed in claim 9 wherein said power resistor has a resistance and heat dissipating characteristics selected for generating sufficient heat for maintaining said thermostat open after said battery pack is substantially fully charged.

11. A charging circuit as claimed in claim 9 further comprising a forward-biased diode interconnected between said output electrode of said transistor and said power resistor.

12. A charging circuit as claimed in claim 9 further comprising a visual indicator means connected in parallel with said power resistor for providing a visual indication when said battery pack is substantially fully charged.

13. A charging circuit as claimed in claim 12 wherein said visual indicator means is a light emitting diode.

* * * * *